United States Patent

Dailey, Jr.

[15] 3,674,076

[45] July 4, 1972

[54] PNEUMATIC TIRE TREAD DESIGN

[72] Inventor: Charles R. Dailey, Jr., Cuyahoga Falls, Ohio

[73] Assignee: The General Tire & Rubber Company

[22] Filed: June 8, 1970

[21] Appl. No.: 44,294

[52] U.S. Cl. ...................... 152/209 R, 152/324, 152/352, DIG./3
[51] Int. Cl. ...................................................... B60c 11/06
[58] Field of Search ......... 152/209 R, 209 D, DIG. 3, DIG. 4, 152/324, 325, 352

[56] References Cited

UNITED STATES PATENTS

| | | | |
|---|---|---|---|
| 2,260,193 | 10/1941 | Overman | 152/209 R |
| 2,265,543 | 12/1941 | Overman | 152/209 R |
| 1,662,599 | 3/1928 | Brown | 152/209 R |
| 1,999,988 | 4/1935 | Anderson | 152/209 R |

FOREIGN PATENTS OR APPLICATIONS 655,710   8/1951   Great Britain ..................... 152/209 R Primary Examiner—Drayton E. Hoffman
Attorney—Frank C. Rote, Jr. and Harry F. Pepper, Jr.

[57] ABSTRACT

A pneumatic tire tread is provided with a groove or series of grooves of continuously variable width around the circumference of the tire. The groove or grooves may be used in combination with rib elements which are uniform or variable in width. The respective pitches of the grooves are offset or different, such that the forward portion of the tread footprint area will present alternating opening and closing voids, thereby effecting a pulsating or pumping action just ahead of the tire footprint, such that water tending to accumulate ahead of the tire can be more quickly pumped through toward the rear to prevent the build-up of a layer of water. Prevention of this water accumulation or build-up reduces the tire's inclination toward hydroplaning.

8 Claims, 12 Drawing Figures

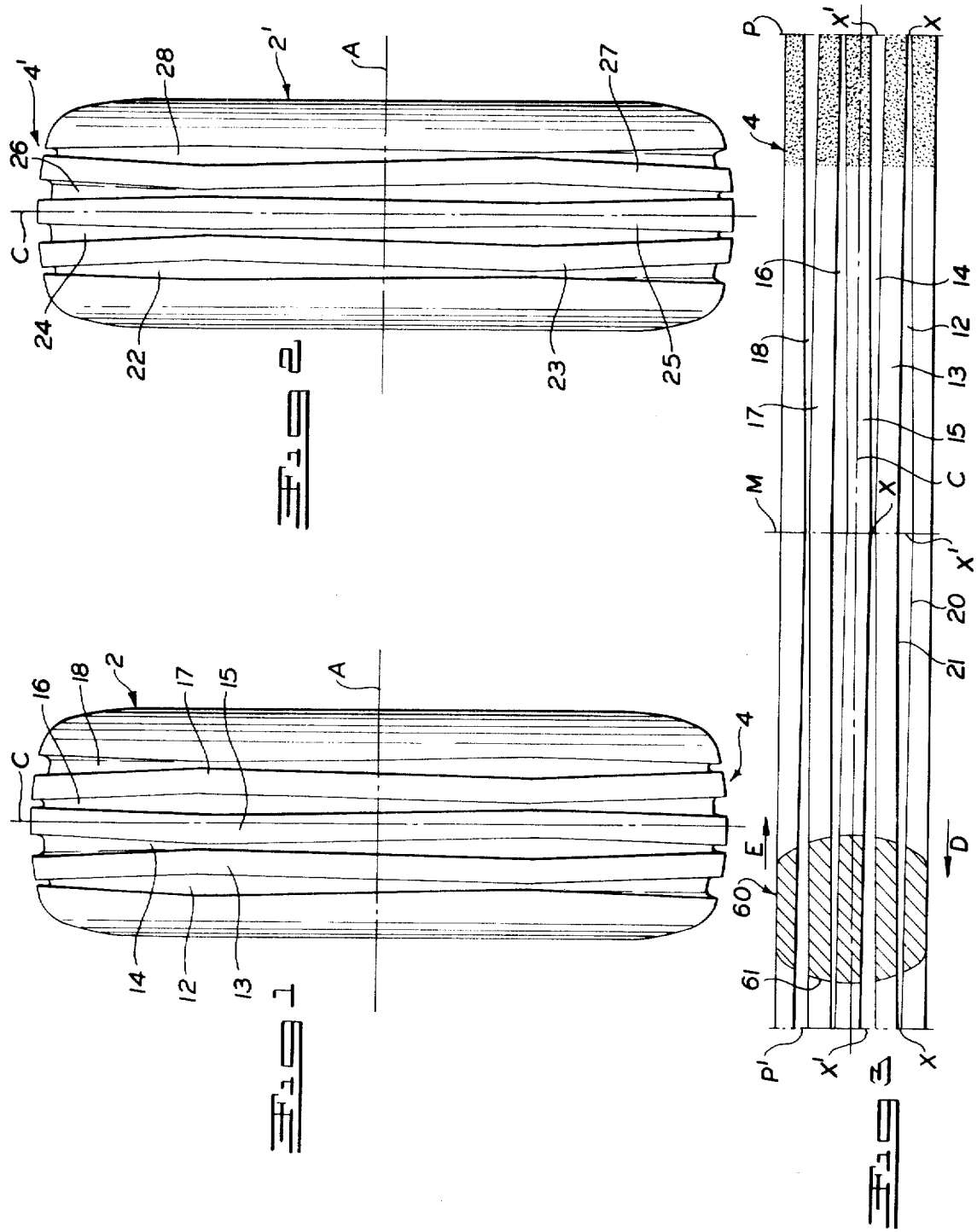

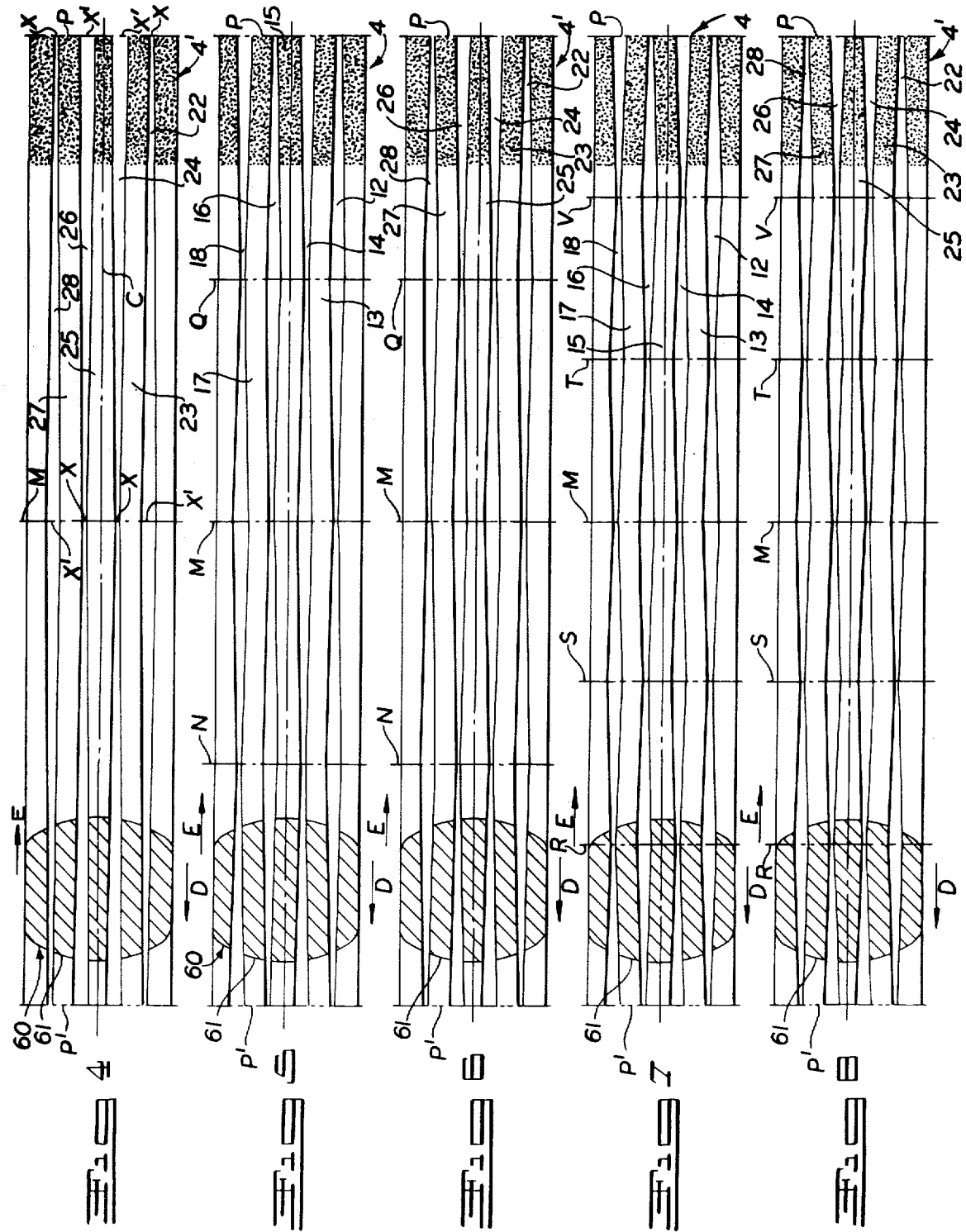

PNEUMATIC TIRE TREAD DESIGN

BACKGROUND OF THE INVENTION

"Hydroplaning is a term used to describe the phenomenon which occurs when a rotating tire is lifted completely from the pavement or roadway, by a layer or film of liquid and is supported solely by that layer of liquid. Hydroplaning usually occurs on heavily flooded or puddled pavements. When tires are rolling over a wet roadway, hydrodynamic pressures develop between the pavement and the tire "footprint" or that portion of the tread area of the tire in contact with or engaging the pavement. Larger hydrodynamic pressures will develop with greater rolling speeds. At a certain speed and with a given accumulation or build-up of water immediately ahead of the footprint, hydrodynamic lift will cause the tire to rise from the pavement leaving it supported by a water film or layer between the tire and the pavement.

Because rotation of the tire, directional stability and braking depends upon a certain amount of contact between pavement and tread rubber, a fully or totally hydroplaning tire will gradually stop rotating or "spin down" and turning of the wheels or application of the brakes is ineffective to control the vehicle.

It is generally conceded that any tire can hydroplane, given a sufficient accumulation of water ahead of the tire and the proper or "critical" tire speed. Presently, much attention is being directed to the prevention of aircraft tire hydroplaning. There is also concern, however, in connection with passenger and truck tires. Hydroplaning of aircraft is more frequent because of high landing and take-off speeds necessary.

It has been found that a tire tread design or pattern can have an affect upon tendency toward hydroplaning. Water building up ahead of the tire footprint with a tread design having circumferentially continuous grooves can pass through these grooves to the rear of the tire. When a tire is rolling on a particularly wet pavement and at a particular instant, the portion of the tire tread in contact with the pavement will displace a certain portion of the water on the pavement, some of which accumulates just ahead of the footprint. The faster the tire is rotating the less time available for reducing this accumulation by passage of water through grooves of the tread. In other words, when a tire is rotating at high speeds the water can be accumulating ahead of the tire much faster than it can be passed through the grooves to the rear of the tire. Fast accumulation of water ahead of the tire without sufficiently fast passage of water through toward the rear can result in hydroplaning.

Logically, the wider and/or deeper a tread groove, the more water passed through to the rear of the tire. However, the wider groove necessarily means less rubber for contact with the road. Thus, grooves can be only so wide in order that proper amounts of tread are available for contact with the road.

Thus, there have been continual developments of tread pattern designs in an attempt to provide more effective passage of water through the tire footprint area. For example, a tire tread may be designed with auxiliary oblique grooves connected to the primary or continuously extending grooves. Also, dimples or pockets have been provided in the rib elements between the primary grooves in an effort to produce more water capturing or removing voids. Treads designed in this way have been shown to at least raise the critical speed at which hydroplaning can occur given a sufficient amount of water. However, along with improved anti-hydroplaning characteristics has come increases in tread wear problems. Treads with oblique or auxiliary grooves have been found to chunk out or separate from the body of the tire particularly at very high speeds. Thus, while the treads described do improve the anti-hydroplaning affect on a flooded or heavily puddled runway or roadway, on dry pavements particularly treads designed in this way are prone to early failure due to rapid tread wear and separation.

SUMMARY OF THE INVENTION

It is an object of the present invention to provide a pneumatic tire tread which is anti-hydroplaning in character.

It is another object of the present invention to provide a pneumatic tire tread design which will extend the critical hydroplaning speed and minimize the chunk-out or tread separation problems on dry runways which are often present in other anti-hydroplaning tread designs.

These and other objects which will become evident in the following description are achieved by providing a tire tread in which the primary or circumferentially continuous grooves are of variable width around the tire. A variable width groove according to the present invention is such that the edges thereof are mutually non-parallel between any two planes containing the axis of rotation of the tire. In a preferred form a tread includes at least two of such variable width continuous grooves. These grooves may have the same or different pitch lengths. In a tread design with the same pitch length, it is preferred that the pitches of at least two of the variable width grooves be offset circumferentially in relation to each other. The variation in width of a groove is effected by designing the edges to extend at slight angles to the circumferential center-line of the groove. The edges of a groove are always non-parallel around the tire and will first converge to a minimum spacing and then diverge to a maximum spacing. A rib between two grooves can be, according to the present invention, of uniform width or variable width. Also, the edges of a groove in accordance with the invention can converge to a minimum spacing at equal but opposite angles relative to the circumferential center-line of the groove, and then diverge to the maximum spacing again at equal but opposite angles relative to the circumferential center-line of the groove. By off-setting the pitch from groove to groove or by changing the pitch length from groove to groove, provides alternately opening and closing voids at the forward portion of the tire footprint. This pulsates or pumps water accumulated ahead of the footprint through the grooves toward the rear of the footprint. This pulsating or pumping action causes water to pass through the grooves at a faster rate than is possible with grooves which are of uniform width. This action extends the critical speed at which hydroplaning can occur. Further, if the extended hydroplaning critical speed is reached, the converging and diverging sides of the groove will tend to break up the water layer or film which initiates hydroplaning.

BRIEF DESCRIPTION OF THE DRAWINGS

The attached drawings show several variations in the invention according to preferred embodiments thereof in which:

FIG. 1 is an elevation of a tire having a tire tread designed according to a general preferred embodiment of the invention.

FIG. 2 is an elevation of a tire having a tire tread designed according to another general preferred embodiment of the invention.

FIG. 3 represents a planar layout of a part of the tread portion of the tire shown in FIG. 1.

FIG. 4 represents a planar layout of a part of the tread portion of the tire shown in FIG. 2.

FIG. 5 is a planar layout of a part of a tread portion designed similarly to that shown in FIGS. 1 and 3, except that the groove pitch length is shorter.

FIG. 6 is a planar layout of a part of a tread portion similar to that shown in FIGS. 2 and 4, except that the length of groove pitch is shorter.

FIG. 7 represents a still further shortened length of groove pitch in a tread design according to that shown in FIGS. 1, 3 and 5.

FIG. 8 represents a still further shortened length of groove pitch in a tread design according to that shown in FIGS. 2, 4 and 6.

DETAILED DESCRIPTION OF THE PREFERRED EMBODIMENTS OF THE INVENTION

Figure 9:
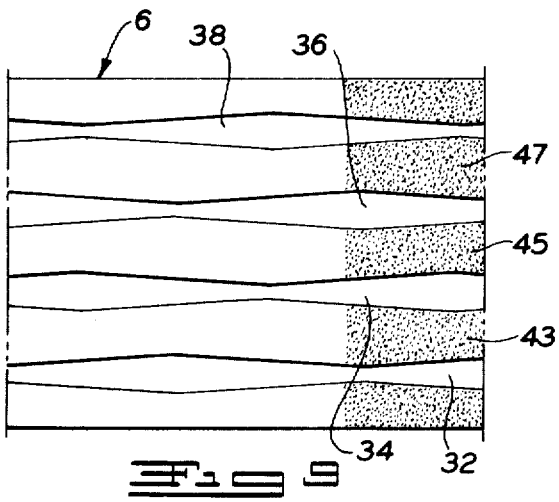
FIGS. 9 through 12 show diagrammatical representations of tire tread sections representing examples of the many possible additional modifications in tread designs according to the basic principle involved in the present invention.

So as to avoid undue repetition of details, the following description will primarily relate to the principle features of the invention as they relate to aircraft tires. It should be understood, however, that these principle features described apply equally as well to typical truck and passenger tires. One notable difference of course between the typical aircraft tread as shown in the drawings and treads of truck and passenger tires is the relatively smooth characteristics of aircraft treads. In other words, truck and passenger tires normally include rib siping. Also, the normally parallel edges of a groove in a typical truck or passenger tire are frequently designed with more abrupt angularity, as for example, in a saw tooth groove.

Also, it should be noted that because of the several variations depicted in the drawings, reference characteristics will be repeated throughout several of the views when referring to similarly located grooves. For example, groove 28 in FIGS, 4, 6 and 8 refer to similarly located grooves on a tread, even though the grooves differ slightly in design as will be explained in more detail hereinafter. Where the general tread pattern differs substantially, different reference characters are used.

FIG. 1 represents an aircraft tire generally indicated 2 having a peripheral tread portion generally indicated 4 providing a ground contact area made up of alternate grooves and ribs. Tread portion 4 of tire 2 is specifically shown to include four grooves 12, 14, 16 and 18 with intermediate ribs 13, 15 and 17. The grooves extend continuously in the circumferential direction or, in other words, are endless, as is preferred in traditional aircraft tire designs. The ribs 13, 15 and 17 also extend continuously in the circumferential direction and are relatively smooth on their outer surfaces as is also preferred in aircraft tire tread design. The grooves 13, 15 and 17, as seen in FIG. 1, are uniform in width, changing angularity relative to the circumferential center-line C of the tire.

FIG. 3 shows a planar layout of a part of the tread portion 4 of tire 2. The portion of tread 4 is taken between two circumferentially spaced planes indicated by lines P and P' which include the principal axis of rotation of the tire indicated by the line A in FIG. 1. The shaded outline area generally indicated 60 on the left-hand portion of FIG. 3 is illustrative of a tire footprint, which will be referred to in more detail later in this description.

The laterally spaced edges of each groove alternately converge to a minimum lateral spacing and diverge to a maximum spacing in a circumferential direction. For example, edges 21 and 23 of groove 12 are seen to diverge from a minimum spacing $x$ at line P to a maximum spacing $x'$ at a line M which is one-half the distance between P and P'. From line or plane M, edges 21 and 23 converge to a minimum spacing $x$ at line P'. The distance between planes P and P' or the circumferential distance "utilized," for example, by groove 12 to go from minimum to minimum spacings will for purposes of this description be termed a "pitch length." Groove 14 has the same pitch length as groove 12, except that it is circumferentially off-set relative to groove 12. In other words, groove 14 converges from a maximum spacing $x'$ at line P to a minimum spacing $x$ at line M, and then diverges once again to a maximum spacing $x$ at line P'. Groove 16 is similar to groove 14. Thus, as seen in FIG. 3, the edges of grooves 12 and 16 are diverging between planes P and M, while the edges of grooves 14 and 18 converge between these same planes. Between planes M and P', the converse is true. It is understood that the tread section between planes P and P' in FIG. 3 can represent the entire tread portion 4, or one of a plurality of circumferentially recurring sections each designed as shown in FIG. 3.

Referring now to FIG. 2, a tire 2' similar to tire 2 of FIG. 1, is provided with a peripheral tread portion 4' having alternately spaced grooves 22, 24, 26 and 28 with intermediate ribs 23, 25 and 27. The principal difference between the tire 2' shown in FIG. 2 and tire 2 shown in FIG. 1 is that the centrally located rib 25 is of variable width compared to the uniform width rib 15 shown in FIG. 1.

FIG. 4 shows a planar layout of a part of tread portion 4' of FIG. 2. Grooves 22, 24, 26 and 28 are of equal pitch-length with grooves 24 and 26 being circumferentially off-set with respect to grooves 22 and 28. Thus, grooves 22 and 28 diverge from as minimum spacing $x$ at plane P to a maximum spacing $x'$ at one-half their pitch length (i.e. plane M). Therefore, as seen in FIG. 4, another difference is evident. In FIG. 3, every other variable groove is off-set circumferentially, while in FIG. 4 the central or inner grooves 24 and 26 are off-set with respect to the outside grooves 22 and 28. This is in no way a limiting feature, but is to point out in a general way, that variations in groove by groove off-set is permissible within the scope of the invention. The main object to be achieved by the off-set of grooves is to provide that where a circumferential portion of one groove is converging, at least one other groove is diverging along that same circumferential portion.

FIGS. 5 and 6 show layouts of tread sections with shortened groove pitch lengths from that shown in FIGS. 3 and 5. Specifically, the pitch length of grooves once again numbered 12, 14, 16 and 18 in FIG. 5, is one-half that of the pitch length of the tread grooves shown in FIG. 3. Similarly, the pitch length of grooves 22, 24, 26, and 28 in FIG. 6 is one-half that of grooves 22 through 28 shown in FIG. 4. FIG. 5 shows a uniform width central rib 15, while FIG. 6 shows a variable width rib 30. Shortening the pitch length of the grooves (i.e. by designing grooves as shown in FIG. 5 compared to those shown in FIG. 3) will allow a more frequent opening and closing of the voids presented at the front of the tire footprint as will be explained later. This may or may not be desirable depending upon the ultimate use of the particular tire. In other words, some tires may be more effective when designed with grooves having a longer pitch length such as shown, for example, in FIG. 3, while others may be more effective utilizing a shorter pitch length as shown, for example, in FIG. 5.

FIGS. 7 and 8 show a further modification of the general tread designs of tires represented in FIGS. 1 and 2. In FIGS. 7 and 8, the pitch length of the grooves has been shortened still further from that described in FIGS. 3 through 6. The central rib 15, FIG. 7, and the central rib 25, FIG. 8, have variable and uniform widths, respectively. It is clear from FIGS. 7 and 8 that the length of the pitch of the variable grooves is one-third the length of the pitch of variable grooves represented by FIGS. 3 and 4. Here again, further shortening of the pitch length changes the frequency or intensity of the pulsating or pumping action, if desired.

The principal differences between the groove pitch in FIGS. 3 and 4 from that of FIGS. 5 and 6 and 7 and 8 is in the length of the pitch. In other words, the recurrence of the groove pitch in a tread represented in FIGS. 7 and 8 is three times that of FIGS. 3 and 4 when rotating while the recurrence of the groove pitch of FIGS. 5 and 6 is twice that of FIGS. 3 and 4.

The edges of the respective grooves are shown preferably symmetrical with respect to the center-line of each groove. In other words, the non-parallel edges of each groove are shown inclined at substantially equal but opposite angles relative to the center-line (not shown) of the groove. Such a preference might be considered slightly better from a standpoint of overall balance. However, it is alternatively possible to provide grooves with non-parallel sides which are not symmetrical relative to the groove center-line, if required.

For a better understanding of the anti-hydroplaning characteristics of treads designed with type of grooves just described, attention is directed to the left-hand portions of each of the treads showing in FIGS. 3 through 8. The shaded area, generally designated 60 in each of these Figures represents a tire footprint. Tires having each of the treads represented by FIGS. 3 through 9 are considered to rotate so that the respective planar layouts will be moving to the left in the direction of arrow D, shown in each of FIGS. 3 through 9. With each tread moving in direction D, each footprint 60 superimposed over the left-hand portion of each tread portion, is visualized as being displaced to the right or "moving" in the direction of arrows E. When traversing a wet pavement, water will accumulate at the forward portions 61 of the moving or changing footprints 60. At an instant of rotation, where footprints 60 are as shown, the forward portions 61 of each includes at least one groove which is opening (diverging) to the accumulated water ahead of the footprint, and at least one other groove which is closing (converging). Specifically, along forward portions 61 of the footprints 60 in FIGS. 3, 5 and 7, grooves 12 and 16 are opening, offering little or no resistance, to the escape of water therethrough. On the other hand, grooves 14 and 18 are closing, resisting water passage and effecting a pulsation of the total accumulation of water ahead of the footprint 60. In FIGS. 4, 6 and 8, the central or inner grooves 24 and 26 are closing in forward portion 61 of the footprints 60, while the outermost grooves 22 and 28 are opening.

This opening and closing action continues in the treads shown in FIGS. 3 and 4 until movement of the tread portions 4 and 4' in the direction of arrow D has effectively resulted in the movement of footprint 60 to the right (in the direction of arrow E) until forward portion 61 of the footprint has reached the plane indicated by M. At this point, the opening and closing alternates or changes such that grooves 14 and 18 (FIG. 3) and grooves 24 and 26 (FIG. 4) are opening, while grooves 12 and 16 (FIG. 3) and grooves 22 and 28 (FIG. 4) are closing. This alternating opening and closing action actually causes a pumping effect on the water to quicken its escape through the grooves toward the rear of the footprint. Thus, in FIGS. 3 and 4, the opening and closing of grooves alternates once between planes P and P' at plane M.

In FIGS. 5 and 6 which show treads 4 and 4' respective having grooves of shorter pitch than shown in FIGS. 3 and 4, the opening and closing of the grooves alternates three times between planes P and P', once at plane N, again at plane M and a third time at plane Q.

The treads 4 and 4' in FIGS. 7 and 8, respectively, alternate five times between planes P and P', at planes R, S, M, T and V.

It is evident that many further modifications of the tread design specifically shown in FIGS. 3 through 9 are possible to achieve the alternating opening and closing action as described in the foregoing. FIGS. 9 through 12 suggest several example modifications considered equally effective designs for purposes of anti-hydroplaning. It is to be understood that these examples are not those exclusively possible, but are considered exemplary recognition of the many modifications that are possible.

In FIGS. 9 through 12, the tread sections are generally designated 6 while the grooves are referred to by characters 32, 34, 36 and 38. The intermediate ribs will be referenced individually as they are discussed.

In FIG. 9, each of grooves 32, 34, 36 and 38 are circumferentially off-set with respect to each of the others. The grooves in the treads demonstrated in FIGS. 3 through 9 were off-set in respective pairs. In the tread 6 of FIG. 9, each groove is individually shown in FIG. 9, provides that each of the intermediate ribs, 43, 45 and 47 are variable in width.

Figure 10:
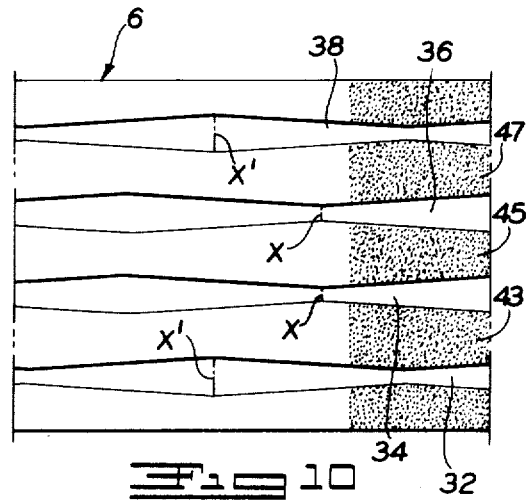

In FIG. 10, the grooves 32, 34, 36 and 38 are shown in off-set pairs as previously described, but are modified such that the amount of off-set is not as great. In other words, while grooves 34 and 36 are off-set relative to grooves 32 and 38, the off-set is not such that the minimum spacings x are directly axially adjacent the maximum spacings x' of grooves 38 and 36. The intermediate ribs in FIG. 10 while not identical to ribs 43, 45 and 47 in FIG. 9 are variable in width rather than uniform and are thus referenced similarly.

Figure 11:
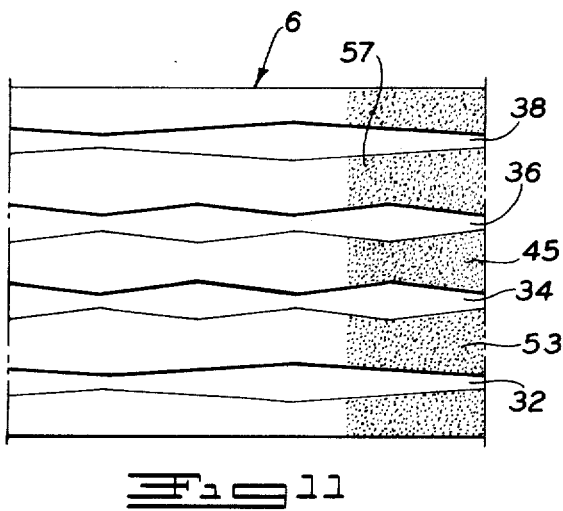

FIG. 11 shows a tread 6 where the grooves thereof vary in pitch length. Central grooves 34 and 36 are shorter in pitch length than are outer grooves 32 and 38. The treads described in connection with FIGS. 3 through 9, were provided with off-set grooves which are all of equal pitch length. FIG. 11, therefore, indicates that grooves may vary in pitch length in a single tread. The rib 45 is variable in width, while ribs 53 and 57 are uniform.

Figure 12:
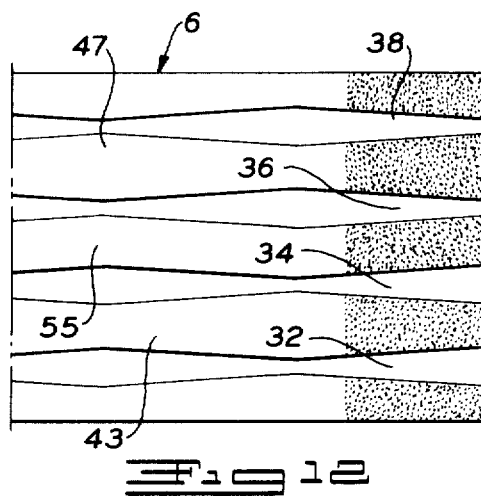

In FIG. 12, a modification provides for the lateral ribs 43 and 47 to be variable in width while the central rib 55 is uniform. This modification illustrates the further possibility of combining variable and uniform width grooves in any manner desired.

The critical feature common to all the above exemplary modifications is that the tread be designed so that at the forward portion of a given footprint at least one groove is opening and diverging, while at least one other groove is converging.

Tread designs according to the present invention are applicable to tires in which hydroplaning speeds may be reached. This includes primarily aircraft tires, but can also include passenger and/or truck tires. While hydroplaning conditions are less likely to occur in passenger and truck tires, there have been instances in which hydroplaning has caused serious accidents. Given the sufficient amount of water build-up ahead of the tire, the proper weight on the tire, tire pressure and velocity, hydroplaning can occur irrespective of whether the critical speed is high as in aircraft, or relatively low as in passenger and trucks. Thus, treads designed according to this invention are found to prevent, in most cases, the build-up of a volume of water ahead of the tire which is sufficient to cause the hydrodynamic lift necessary for hydroplaning. In addition, while there are hydroplaning treads designed primarily to achieve more efficient and faster escape of water ahead of the tire to the rear of the tire, most have been accompanied by undesirable effects on tread wear. Because the treads, according to the present invention, do not include abrupt or sharp changes in the groove width and still effect a variable water passage through the tire footprint, the instances or direct causes of tread chunk-out and increased wear are avoided.

From the foregoing, it is seen that many modifications and variations are contemplated within the scope of the invention in order to acquire the fast and efficient transfer or escape of water from the front of the tire footprint toward the rear. The detailed description hereinbefore presented suggest a few of these modifications. Other modifications should be evident, with the prime design consideration being that at least one groove be off-set with respect to another in order that there is an alternately closing and opening of voids transversely of the tread at the forward portion of the footprint area. This will extend the critical speed at which hydroplaning occurs. If this extended critical speed is by chance reached and hydroplaning conditions are met, the converging and diverging walls of the variable conditions are met, the converging and diverging walls of the variable width grooves would further aid in breaking up the hydroplaning film which begins to develop beneath the tread surface.

While the foregoing is an exemplary coverage of the invention according to several preferred embodiments, there are understood to be certain obvious modifications which can be made without departing from the scope of the invention. These modifications should be considered as part of the instant invention which is to be measured by the scope of the appended claims.

What is claimed is:

1. A pneumatic tire with a tread portion having a peripheral ground contacting surface provided with a plurality of circumferentially continuous grooves of uniform depth and defined by laterally spaced, substantially linear edges, at least one of said grooves being of continuously variable width in the circumferential direction such that portions of said laterally spaced edges between any two planes which contain the axis of rotation of said tire and intersect said tread portion are mutually non-parallel.

2. The invention as defined in claim 1 wherein each of said plurality of grooves is of continuously variable width, such that the laterally spaced edges of each of said grooves are mutually non-parallel between any two planes containing the axis of rotation of said tire.

3. The invention as defined in claim 2 wherein said grooves have the same pitch.

4. The invention as defined in claim 3 wherein the pitch of at least one of said grooves is circumferentially offset with respect to the pitch of another of said grooves.

5. The invention as defined in claim 2 wherein at least one of said grooves has a pitch different from that of another of said grooves.

6. The invention as defined in claim 1 wherein said laterally spaced non-parallel edges of at least one variable width groove converge to a preselected minimum spacing and diverge to a preselected maximum spacing in circumferentially adjacent portions of said peripheral ground contacting surface.

7. The invention as defined in claim 6 wherein said laterally spaced non-parallel edges converge and diverge at equal but opposite angles relative to the circumferential center-line of said at least one variable width groove.

8. The invention as defined in claim 2 wherein the said laterally spaced, mutually non-parallel, edges of each of said grooves converge to a preselected minimum spacing and diverge to a preselected maximum spacing in circumferentially adjacent portions of said ground contacting surface.

* * * * *